United States Patent [19]
Pedersen

[11] Patent Number: 5,810,553
[45] Date of Patent: Sep. 22, 1998

[54] PUMP PROVIDED WITH AT LEAST ONE ROTARY SHAFT

[75] Inventor: Bent Pedersen, Arhus C, Denmark

[73] Assignee: APV Fluid Handling Horsens A/S, Horsens, Denmark

[21] Appl. No.: 655,057

[22] Filed: May 29, 1996

[51] Int. Cl.⁶ .................................................. F04D 29/08
[52] U.S. Cl. .................... 415/170.1; 415/174.2; 415/174.3; 277/92
[58] Field of Search .............. 415/170.1, 174.2, 415/174.3, 229, 208.1; 277/92, 85, 93 R, 81 R, 177

[56] References Cited

U.S. PATENT DOCUMENTS

| | | | |
|---|---|---|---|
| 2,733,682 | 2/1956 | Langteau | 415/174.3 |
| 3,384,025 | 5/1968 | Chabica et al. | 415/174.3 |
| 4,377,290 | 3/1983 | Netzel | 277/93 R |
| 4,844,483 | 7/1989 | Iijima et al. | 277/92 |
| 5,071,318 | 12/1991 | Bice et al. | 415/170.1 |
| 5,188,509 | 2/1993 | Shimanuki et al. | 415/208.1 |
| 5,560,621 | 10/1996 | Zutz | 277/92 |
| 5,571,268 | 11/1996 | Azibert | 277/85 |
| 5,605,436 | 2/1997 | Pedersen | 415/170.1 |

*Primary Examiner*—John T. Kwon
*Attorney, Agent, or Firm*—McDermott, Will & Emery

[57] ABSTRACT

In order to reduce the requirements for cleaning and provide a structure which is also easy to disassemble for cleaning without the use of tools, a pump, which has a rotary element such as an impeller shaft, is provided with a seal which is arranged so that an annular seal element, such as an O-ring, is disposed in an annular chamber which is sufficiently elongate to allow for a small amount of reciprocal movement of the seal element therein. The movement of the seal member promotes a self-cleaning action which obviates the build-up of particulate material in the annular chamber.

9 Claims, 2 Drawing Sheets

PUMP PROVIDED WITH AT LEAST ONE ROTARY SHAFT

BACKGROUND FOR THE INVENTION

1. Field of the Invention

The invention relates to a pump provided with at least one rotary shaft, such as a centrifugal pump or a rotor lobe pump and with a rotary pump part or pans such as an impeller or rotor lobes, as well as with a pump housing, where a shaft seal device is arranged between the shaft and a rear wall in the pump housing at the location where the shaft extends through a hole in the rear wall.

2. Background Art

A centrifugal compressor wit an impeller and a housing is known, were a shaft seal device comprising an O-ring is mounted between the shaft of the impeller and the rear wall of the pump housing at the location where the shaft extends through a hole in the rear wall. However, this shaft seal device is rather difficult to clean and mount inter alia due to the immobility of the O-ring relative to the surrounding parts.

SUMMARY OF THE INVENTION

The object of the invention is to provide a pump of the above type where the shaft seal requires less leaning than hitherto known and where the shaft seal is easy to dismount/mount without the use of tools when it is to be cleaned manually.

In order to achieve the above object there is provided by the present invention a pump, wherein the shaft seal device comprises a stator ring rigidly secured in radial direction to the rear wall by means of permanently mounted retaining means, where a rotor ring is fixedly connected with the rear face of the rotary pump parts, such as tie impeller or the rotor lobes, and may sealingly abut said stator ring and where an annular chamber is provided between the rear wall and the stator ring and houses a sealing, resilient ring such as an O-ring, said annular chamber having an axial length exceeding the axial dimension of the cross-section of the resilient e.g an O-ring and being provided with a circumferential, essentially funnel-like inlet passageway. The resulting shaft seal is particularly easy to clean, as the resilient, sealing ring may perform small reciprocate axial movements inside the chamber during the operation of the pump—especially because the axial length of the annular chamber exceeds the axial length of the sealing ring. In other words, the ring and its annular chamber are both essentially self-cleaning. As a result, the present centrifugal pump is particularly suited for the pumping of fluid foods obviously requiring a high hygienic standard. The shaft seal is moreover very easy to mount, as no special tools are required for the mounting thereof Only the stator ring and the rotor ring need to be replaced in case the shaft seal is damaged and these parts arc relatively easy to dismount/mount, as said permanent retaining means remain untouched According to the invention the annular chamber may be defined by an inner, circumferential, preferably essentially cylindrical recess in the rear wall and by an outer essentially cylindrical surface on the stator ring as well as by an end collar formed on the stator ring, whereby the rotor ring may abut said end collar and whereby said cylindrical recess may optionally be rounded at the transition area between the cylinder surface and a planar bottom face. In this manner, particularly good conditions are provided for the O-ring to be able to perform small reciprocating movements in the annular chamber.

Furthermore, according to the invention the portion of the end collar of the stator ring facing the cylindrical surface of the stator ring may be frusto-conical and optionally provided with one or several circumferential projections, where the annular chamber may have a length of 1.1–1.5, preferably 1.2–1.3 times the diameter of the O-ring. The resulting embodiment turned out to be particularly advantageous.

Moreover, according to the invention the circumferential recess provided in the rear wall may be arranged adjacent an essentially frusto-conical surface on the side of the rear wall facing the impeller. Thus, it is readily obtained that circulating flows can arise in the pump medium on the delivery side of the pump (the rear face of the impeller), said flows preventing a portion of the pump medium (the foodstuff) from harmfully remaining in the same place for a long period of time.

According to the invention the rotor ring may be attached to the rear face of the impeller by being inserted directly into a preferably cylindrical auxiliary recess formed in the rear face of the impeller and optionally provided with a stepped bottom, whereby the rotor ring further may be fixed in said recess by means of pressing or by means of a fixing member such as a fixing pin, a second sealing chamber being provided between the face of the rotor ring facing radially outwardly and a face in the auxiliary recess facing radially inwardly, whereby a sealing, resilient auxiliary ring such as an auxiliary O-ring is inserted into said second chamber preferably having an axial length of 1.1–1.5, e.g. 1.2.–1.3 times the axial dimension $\delta$ of the auxiliary ring. Accordingly, the complete seal may be produced very easily, as the rotor ring is attached to the impeller in a very simple manner. The auxiliary ring ensures that an efficient seal is applied at the shaft between the pump medium on the rear side of the impeller and the chamber between the rotor ring and the outer face of the pump shaft.

Furthermore, according to the invention the rotor ring and/or the stator ring may be essentially S-shaped in cross-section, which proved to be a particularly advantageous shape in practice.

According to the invention the permanent retaining means securing the stator ring to the rear wall may be formed by a preferably pot-shaped, cover-like holder member fixed to the rear wall e.g. by means of screws, where a preloaded spring means is arranged between the holder member and stator ring coaxially with the latter, said spring means e.g. being a coil spring pressing against an annular disc which in turn presses against the end face of the stator ring facing away from the impeller. As a result, an extremely simple and inexpensive shaft seal is obtained, as all parts thereof except the stator ring are to be considered permanent. In other words, only the stator ring needs to be replaced when/if this is worn on its face facing the rotor ring (the rotor ring abutting and rotating on said face).

According to the invention, on the side facing the end face of the stator ring the annular disc may be provided with at least one axially extending, pin-like projection which co-acts with a notch in the end of the stator ring so as to prevent a rotation of the stator ring, but nevertheless allows for small axial movements thereof, whereby the annular disc along its circumference may be provided with at least one pin-like projection extending radially outwardly and co-acting with notches in the pot-shaped, cover-like holder member so as co prevent a rotation of the annular disc. It is thus ensured that tie stator ring is fairly accurately fixed relative to the rear wall, but nevertheless in such a manner that if necessary it may be slightly displaced in axial direction, confer the axial pressure of the coil spring on the stator ring.

Finally, according to the invention a drain cylinder may be inserted through a hole in the annular disc and in continuation of the stator ring, the inner diameter of said cylinder essentially corresponding to the inner diameter of the stator ring, whereby the drain cylinder may possibly project outwardly through a central hole in the pot-shaped holder member. Consequently, if—contrary to expectations—a small amount of the pump medium leaks through the seal between the stator ring and rotor ring onto the pump shaft, said amount of pump medium does not escape to the coil spring, the delivery disc, etc. of the shaft seal, but is carried off into the open air through an annular chamber between the drain pipe and the shaft.

The invention further relates to a shaft seal according to claims 1 to 9 used in connection with the centrifugal pump according to claims 1 to 9.

BRIEF DESCRIPTION OF THE DRAWINGS

The invention is explained in detail below with reference to the drawings, in which.

DETAILED DESCRIPTION OF PREFERRED EMBODIMENTS

Figure 1:
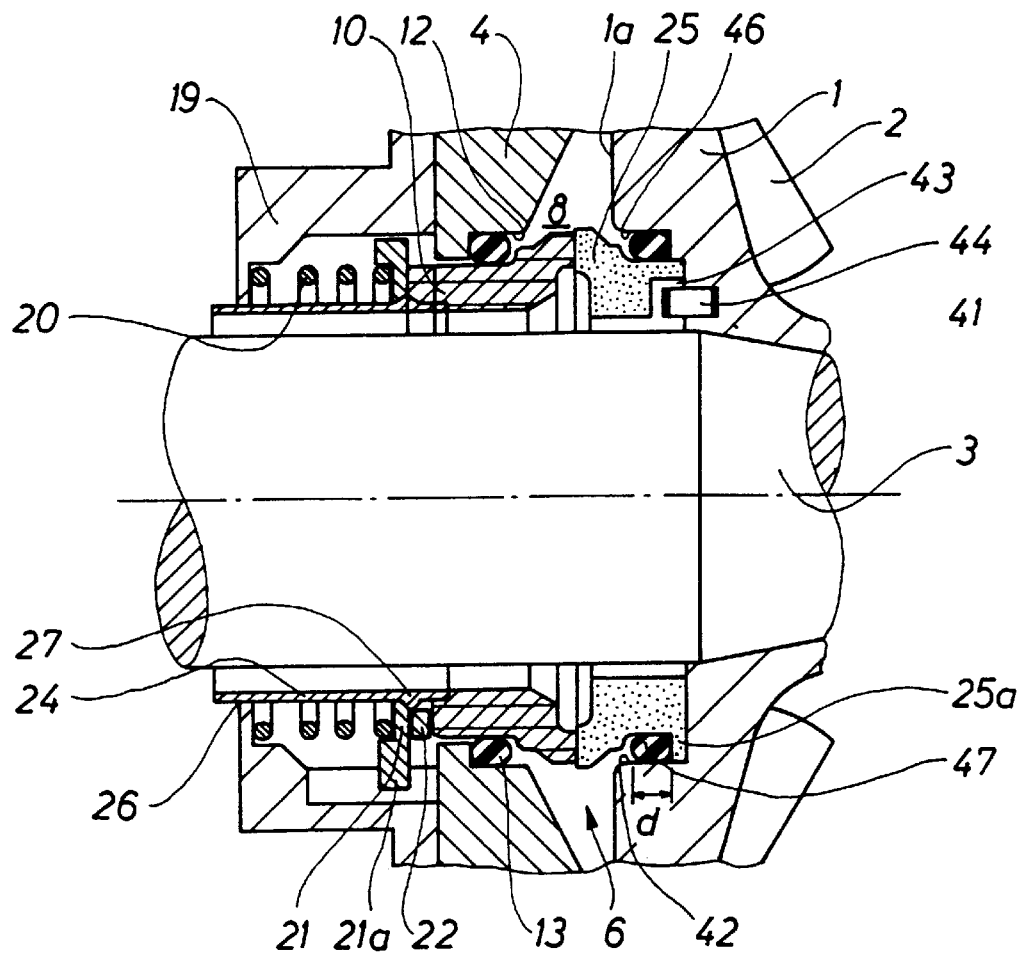
FIG. 1 illustrates an embodiment of the pump according to the invention formed as a centrifugal pump and provided with the special shaft seal, a large portion of the impeller as well as the pump housing being removed except for a small portion of the rear wall.

The centrifugal pump shown in FIG. 1 comprises an impeller 1 provided with blades 2 and attached to a pump shaft 3. The pump shaft extends through a hole in the rear wall 4 of the pump housing. A shaft seal device 6 is mounted between said rear wall and the pump shaft. This device comprises a stator ring 10 attached to the rear wall 4, a rotor ring 25 firmly connected with the rear face of the impeller sealingly abutting the end face of the stator ring. As it appears the outer surface of the shaft 3 and the inner surface of the stator ring 10 and the rotor ring 25 respectively, are slightly spaced apart. An annular chamber 12 is provided between the rear wall 4 and the stator ring 10 and houses a sealing, resilient ring such as an O-ring 13. The axial length of the annular chamber 12 exceeds the axial dimension (in this case the diameter) d of the cross-section of the O-ring and the chamber is further provided with an essentially circumferential, funnel-like inlet passageway 14. As the axial length of the chamber 12 exceeds the cross-section of the O-ring 13, the O-ring 13 may perform quite small, reciprocate axial movements during operation of the pump, whereby the O-ring acts to clean the chamber 12. The self-cleansing ensures that the pump medium (such as a fluid foodstuff) is prevented from settling permanently in corners of the chamber.

Figure 2:
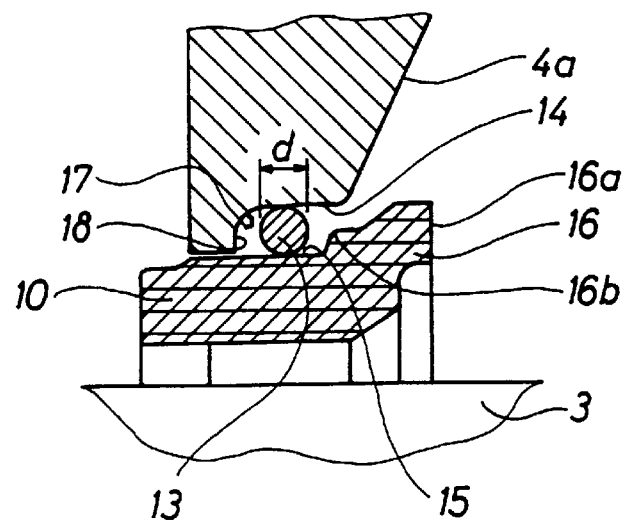
FIG. 2 is on a larger scale a view of the annular chamber in which a O-ring is arranged.

As shown in FIG. 2, the annular chamber 12 may be defined partly by an inner, circumferential, preferably essentially cylindrical recess 14 in the rear wall 4, partly by an outer, essentially cylindrical surface 15 on the stator ring 10 and partly by an end collar provided on said stator ring. The end face of the rotor ring 25 may abut the end face 16a of this end collar.

As shown on the left-hand side in FIG. 2, the cylindrical recess 14 may be rounded in the transition area 17 between the inner cylinder face of the recess 14 and the planar bottom face 18 of said recess. The rounding on the transition area 17 is usually circular.

The portion of the end collar 16 of the stator ring 10 facing the cylinder face of the said ring 10 may be frusto-conical and optionally be provided with one or several circumferential, rounded projections 16b. Preferably, the annular chamber 12 has a length of 1.1–1.3, e.g. 1.2–1.3 times the cross-sectional diameter d of the O-ring.

As shown in FIG. 2, the circumferential recess 12 provided in the rear wall 4 may be arranged adjacent an essentially frusto-conical face 4a on the side of the rear wall 4 facing the impeller 1.

The rotor ring 25 may be attached to the rear face 1a of the impeller by being inserted directly into the hub portion 41 of the impeller 1. As it appears, the rotor ring is inserted into an auxiliary recess 42 in the hub of the impeller 1, said auxiliary recess preferably being cylindrical and optionally provided with a stepped bottom 43. The rotor ring may be fixed in the auxiliary recess by means of pressing or by means of a fixing member, such as a fixing pin 44. A second sealing chamber 46 may be provided between the face 25a of the rotor ring 25 facing radially outwardly and a face in the auxiliary recess facing radially inwardly, whereby a sealing, resilient auxiliary ring such as an auxiliary O-ring 47 is inserted in the second chamber. Preferably, this sealing chamber has an axial length of 1.1–1.5, e.g. 1.2 to 1.3 times the axial dimension (in this case the diameter) d of the cross-section of the auxiliary ring.

The rotor ring 25 and/or the stator ring 10 may be essentially S-shaped in cross-section.

The stator ring 10 may be secured to the rear wall 4 of the pump housing by means of a pot-shaped cover 19 being secured to the housing e.g. by means of screw, where a preloaded spring means 20, such as a coil spring, is arranged between cover and the stator ring 10 coaxially with the latter and pressing against an annular disc 21, which in turn presses against the end face of the stator ring 10 facing away from the impeller 1.

On the side facing the end face of the stator ring, the annular disc 21 may be provided with at least one axially extending, pin-like projection 22 which may co-act with a corresponding notch in the end of the stator ring to prevent the latter from rotating, but nevertheless allowing small axial movements of the stator ring. Along its circumference, the annular disc may be provided with at two radially extending, pin-like projections (of which only one is visible at the reference numeral 21a in FIG. 1) co-acting with notches or cavities (not shown) in the pot-shaped, cover-like holder member 19 such that the pressure disc 21 cannot rotate relative to the holder member 19.

A drain cylinder 24 may be inserted through a central hole in the annular disc 21 and in continuation of the stator ring 10, the inner diameter of said cylinder essentially corresponding to the inner diameter of the stator ring 10, a cavity being provided between the shaft 3 and the inner face of the stator ring and the drain cylinder respectively. The drain cylinder may project outwardly through a central hole 26 in the cover 19. The drain cylinder may be secured to the stator ring 10 by pressing one or several projections 27 on the drain cylinder 24 against the stator ring 10 by means of the annular disc 21.

The term "O-ring" is to be understood in the broadest sense of the word, as said ring not only may have a circular cross-section, but also a C-shaped, square or V-shaped cross-section.

Figure 3:
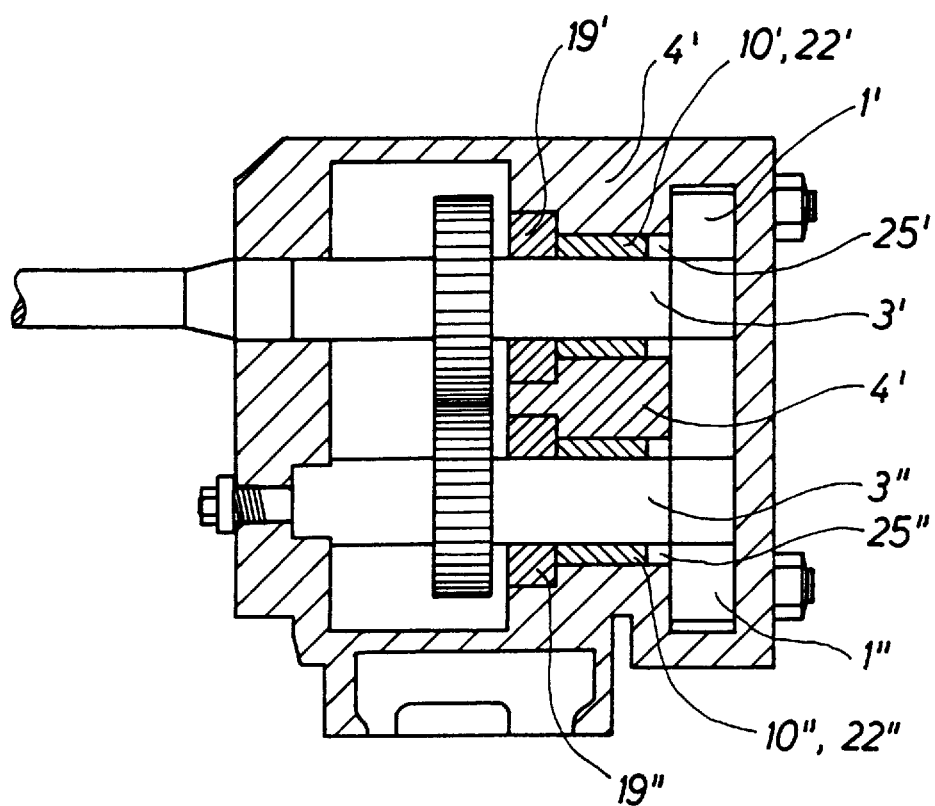
FIG. 3 is a diagrammatic, cross-sectional view of a second embodiment of the pump according to the invention which takes the form of a rotor lobe pump.

As shown in FIG. 3, the pump may be a rotor lobe pump (a rotary gear pump). If so, two shafts 3' and 3" are arranged in the wall 4 of the pump housing. Each shaft is provided with a lobe-gear 1', 1" respectively. Corresponding to the stator ring 10 with a sealing, resilient ring 22 in FIG. 1, a stator ring 10, 10' and sealing, resilient rings 22', 22" are now provided. The permanently mounted retaining means are indicated by means of the reference numerals 19', 19". A rotor ring corresponding to the rotor ring in FIG. 1 is indicated by means of the reference numerals 25',25" in FIG. 3. The shaft seal devices in FIG. 3 act in the same manner as the shaft seal shown in FIG. 1.

The invention may be modified in many ways without thereby deviating from the scope thereof.

We claim:

1. A pump for pumping fluid foods wherein a high hygienic standard is required, said pump being provided with at least one rotary shaft and a rotatory pump part, a pump housing, and a self-cleaning shaft seal device arranged between the shaft and a rear wall of the pump housing at the location where the shaft extends through a hole in the rear wall, the shaft seal device comprising:

a stator ring rigidly secured to the rear wall by means of permanently mounted retaining means;

a rotor ring fixedly connected with the rear face of the rotatory pump part so as to sealingly abut said stator ring; and an annular chamber which is provided between the rear wall and the stator ring and which houses a sealing, resilient ring, said annular chamber having an axial length exceeding the axial dimension of the cross-section of the resilient ring, said annular chamber being provided with a circumferential, radially extending essentially funnel-like inlet passageway, said funnel-like inlet passageway communicating in an essentially unrestricted manner with the annular chamber so as to permit particulate matter to be freely discharged from said annular chamber into the essentially funnel-like inlet passageway, wherein the portion of the end collar of the stator ring facing the cylindrical surface of the stator ring is frusto-conical and is provided with at least one circumferential, rounded projection, and wherein the annular chamber has a length of 1.1–1.5, times the cross-sectional diameter of the resilient ring.

2. A pump as claimed in claim 1, wherein the annular chamber is defined by a cylindrical recess formed in the rear wall, a cylindrical face and an end collar formed on the stator ring, wherein the rotor ring abuts the end collar, and wherein the cylindrical recess has a rounded portion at a transition area between a cylindrical wall portion of the cylindrical recess and a planar bottom face of the cylindrical recess.

3. A pump as claimed in claim 1, wherein the circumferential recess provided in the rear wall is arranged adjacent an essentially frusto-conical surface on the side of the rear wall facing the rotatory pump part.

4. A pump for pumping fluid foods wherein a high level of hygiene is required, said pump being provided with at least one rotary shaft and a rotatory pump part, a pump housing, and a self-cleaning shaft seal device arranged between the shaft and a rear wall of the pump housing at the location where the shaft extends through a hole in the rear wall, the shaft seal device comprising:

a stator ring rigidly secured to the rear wall by means of permanently mounted retaining means;

a rotor ring fixedly connected with the rear face of the rotatory pump part so as to sealingly abut said stator ring; and an annular chamber which is provided between the rear wall and the stator ring and which houses a sealing, resilient ring, said annular chamber having an axial length exceeding the axial dimension of the cross-section of the resilient ring, said annular chamber being provided with a circumferential, radially extending essentially funnel-like inlet passageway, said funnel-like inlet passageway communicating in an essentially unrestricted manner with the annular chamber so as to permit particulate matter to be freely discharged from said annular chamber into the essentially funnel-like inlet passageway, wherein the rotor ring is attached to the rear face of the rotary pump part by direct insertion into a cylindrical auxiliary recess formed in the rear face of the rotary pump part, the rotor ring having a stepped bottom and being fixed in said recess by fixing means, said pump further including a second sealing chamber which is provided between a radially outwardly facing face of the rotor ring and a radially inwardly facing face of the auxiliary recess, and a second sealing, resilient auxiliary ring which is disposed in said second sealing chamber, said second sealing chamber preferably having an axial length of 1.1–1.5, times the axial dimension of the cross-section of the second auxiliary ring.

5. A pump as claimed in claim 4, wherein at least one of the rotor ring and the stator ring has an essentially S-shaped cross-section.

6. A pump for pumping fluid foods wherein a high level of hygiene is required, said pump being provided with at least one rotary shaft and a rotatory pump part, a pump housing, and a self-cleaning shaft seal device arranged between the shaft and a rear wall of the pump housing at the location where the shaft extends through a hole in the rear wall, the shaft seal device comprising:

a stator ring rigidly secured to the rear wall by means of permanently mounted retaining means;

a rotor ring fixedly connected with the rear face of the rotatory pump part so as to sealingly abut said stator ring; and an annular chamber which is provided between the rear wall and the stator ring and which houses a sealing, resilient ring, said annular chamber having an axial length exceeding the axial dimension of the cross-section of the resilient ring, said annular chamber being provided with a circumferential, radially extending essentially funnel-like inlet passageway, said funnel-like inlet passageway communicating in an essentially unrestricted manner with the annular chamber so as to permit particulate matter to be freely discharged from said annular chamber into the essentially funnel-like inlet passageway, wherein the permanent retaining means securing the stator ring to the rear wall includes:

a holder member attached to the rear wall, an annular disc disposed against an end face of the stator ring which faces away from the impeller, a preloaded spring means arranged between the holder member and stator ring and coaxially with the stator ring, said spring means comprising a coil spring which presses said annular disc against the end face of the stator ring.

7. A pump as claimed in claim 6, wherein said annular disc is provided with at least one axially extending, pin-like projection which co-acts with a notch in the end of the stator ring so as to prevent rotation of the stator ring, but allow for a small axial movement thereof, a circumference of the annular disc being provided with at least one pin-like projection which extends radially outward and cooperates with notches in the holder member so as to prevent rotation of the annular disc.

8. A pump as claimed in claim 7, further comprising: a drain cylinder which is disposed in a hole which extends through said annular disc and the stator ring, the outer diameter of said cylinder essentially corresponding to the inner diameter of the stator ring, whereby the drain cylinder projects outwardly through a central hole in the holder member and is optionally attached to the stator ring by at least one projection provided on the drain cylinder, the at least one projection being pressed against the stator ring by said annular disc.

9. A pump comprising:

a housing;

a pump element disposed in the housing;

a shaft which is operatively connected with the pump element and which extends through an opening formed in the housing;

means defining a cylindrical recess in said housing which is coaxial with said shaft and which is in essentially unrestricted communication with a inlet passageway;

a stator ring disposed about a portion of the shaft which extends through said cylindrical recess, said cylindrical recess and said stator ring defining an annular chamber therebetween; and an annular seal element disposed in said annular chamber in a manner to engage a surface of the cylindrical recess and a surface of the stator ring, said annular chamber and said annular seal element being so dimensioned and arranged that said annular seal element can, in a self-cleaning manner, reciprocate back and forth in said annular chamber and discharge particulate matter which has entered said annular chamber into the inlet passageway.

\* \* \* \* \*